(12) United States Patent
Cheong et al.

(10) Patent No.: US 10,488,497 B2
(45) Date of Patent: Nov. 26, 2019

(54) SCANNING LIDAR FOR AN AUTOMATED VEHICLE

(71) Applicant: Aptiv Technologies Limited, St. Michael (BB)

(72) Inventors: Mei Ling Cheong, Singapore (SG); Mang Khong Wong, Singapore (SG)

(73) Assignee: Aptiv Technologies Limited (BB)

( * ) Notice: Subject to any disclaimer, the term of this patent is extended or adjusted under 35 U.S.C. 154(b) by 420 days.

(21) Appl. No.: 15/345,951

(22) Filed: Nov. 8, 2016

(65) Prior Publication Data

US 2018/0128905 A1 May 10, 2018

(51) Int. Cl.
*G01S 7/48* (2006.01)
*G01S 7/481* (2006.01)
*G01S 7/484* (2006.01)
*G01S 17/93* (2006.01)
*G01S 17/42* (2006.01)
*G01S 17/89* (2006.01)

(52) U.S. Cl.
CPC ............ *G01S 7/4817* (2013.01); *G01S 7/484* (2013.01); *G01S 17/42* (2013.01); *G01S 17/89* (2013.01); *G01S 17/936* (2013.01)

(58) Field of Classification Search
None
See application file for complete search history.

(56) References Cited

U.S. PATENT DOCUMENTS

| 5,760,886 A | 6/1998 | Miyazaki et al. |
| 5,787,385 A | 7/1998 | Tognazzini |
| 6,090,100 A * | 7/2000 | Hohla ............ A61F 9/008 606/10 |
| 6,121,574 A * | 9/2000 | Xu ............... G06K 15/029 219/121.69 |
| 2016/0047895 A1 | 2/2016 | Dussan |

OTHER PUBLICATIONS

Zhao, Connected Fermat Spirals for Layered Fabrication, ACM Trans. Graph., vol. 35, No. 4, Article 100, Publication Date: Jul. 2016 (Year: 2016).*

* cited by examiner

*Primary Examiner* — Hovhannes Baghdasaryan
(74) *Attorney, Agent, or Firm* — Joseph V. Bonadies

(57) ABSTRACT

A scanning lidar suitable for use on an automated vehicle includes a laser, a beam-steering means, and a controller. The laser generates a pulsed laser beam. The beam-steering means steers the pulsed laser beam in a direction within a field-of-view of the lidar. The field-of-view is characterized as rectangular-shaped. The controller is in communication with the laser and the beam-steering means. The controller coordinates operation of the laser and the beam-steering means such that the lidar is characterized by an angular-resolution. The controller operates the beam-steering means in accordance with a first rectangular spiral pattern characterized by an aspect-ratio that corresponds to the field-of-view. The first rectangular spiral pattern causes a scan-segment to be skipped during a present-scan of the field-of-view due to the aspect-ratio. As such, the field-of-view is not scanned entirely at the angular-resolution.

17 Claims, 4 Drawing Sheets

FIG. 4A SPIRAL SCAN OUTWARDS

FIG. 4B SPIRAL SCAN INWARDS

SCANNING LIDAR FOR AN AUTOMATED VEHICLE

TECHNICAL FIELD OF INVENTION

This disclosure generally relates to a scanning lidar suitable for use on an automated vehicle, and more particularly relates to a lidar that scans a laser beam with a rectangular spiral pattern characterized by an aspect-ratio that corresponds to a field-of-view, where the rectangular spiral pattern causes a scan-segment to be skipped, whereby the field-of-view is not scanned entirely at the angular resolution of the lidar.

BACKGROUND OF INVENTION

It is known that devices for light detection and ranging (lidar) are important devices for autonomous or automated vehicle operation as a lidar can provide three-dimensional (3D) mapping information of an area proximate to an automated vehicle. To meet field-of-view (FOV) requirements, a laser beam emitted by a lidar is directed in accordance with a scan pattern, and the configuration of that scan pattern may influence the overall performance of the lidar.

SUMMARY OF THE INVENTION

In accordance with one embodiment, a scanning lidar suitable for use on an automated vehicle is provided. The lidar includes a laser, a beam-steering means, and a controller. The laser generates a pulsed laser beam. The beam-steering means steers the pulsed laser beam in a direction within a field-of-view of the lidar. The field-of-view is characterized as rectangular-shaped. The controller is in communication with the laser and the beam-steering means. The controller coordinates operation of the laser and the beam-steering means such that the lidar is characterized by an angular-resolution. The controller operates the beam-steering means in accordance with a first rectangular spiral pattern characterized by an aspect-ratio that corresponds to the field-of-view. The first rectangular spiral pattern causes a scan-segment to be skipped during a present-scan of the field-of-view due to the aspect-ratio. As such, the field-of-view is not scanned entirely at the angular-resolution.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIGS. 4A and 4B are scan patterns of the lidar of FIG. 1 in accordance with one embodiment.

DETAILED DESCRIPTION

Figure 1:
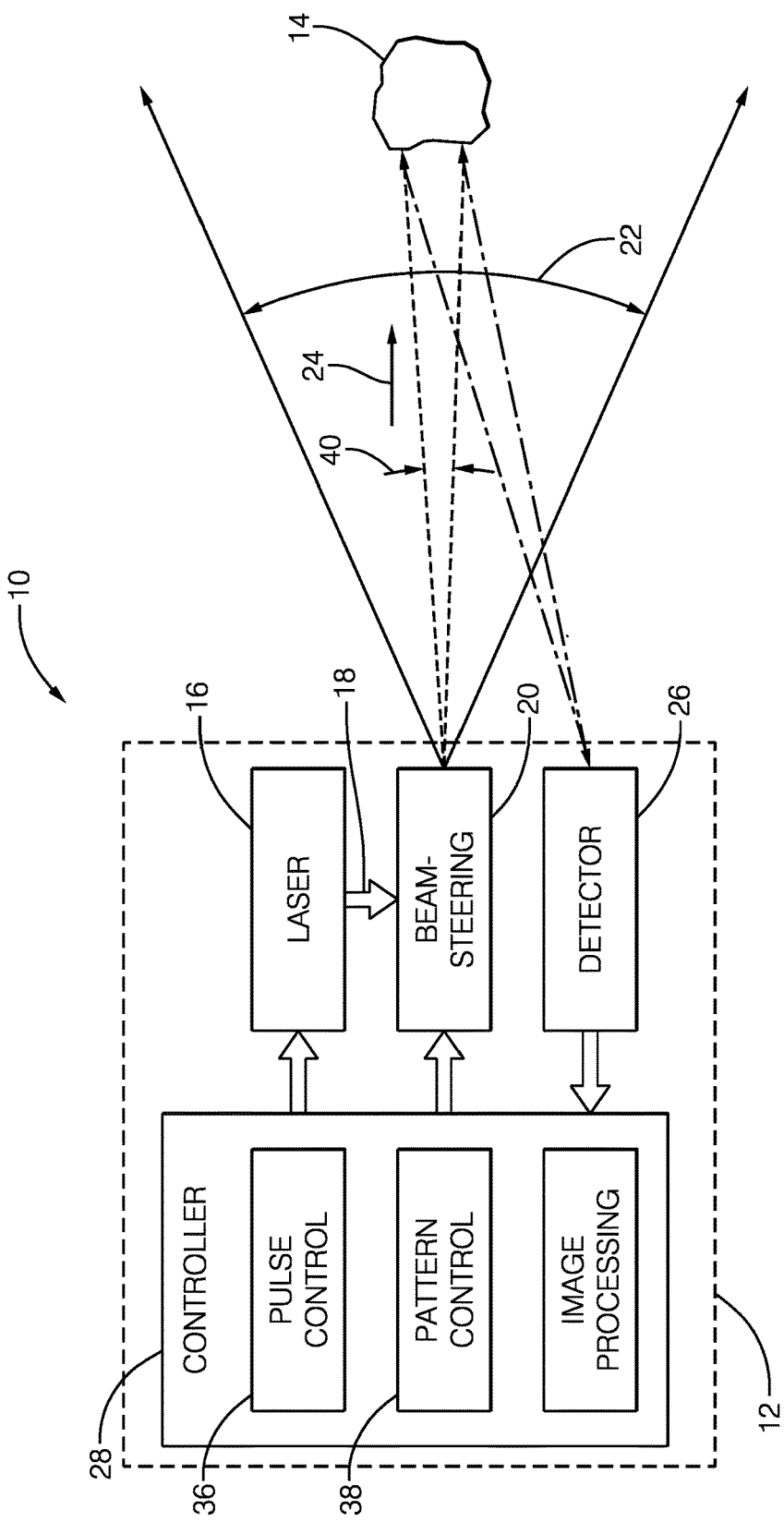
FIG. 1 is diagram of a scanning lidar in accordance with one embodiment.

FIG. 1 illustrates a non-limiting example of a scanning lidar 10, hereafter referred to as the lidar 10, which is suitable for use on an automated vehicle, e.g. a host-vehicle 12. As used herein, the term automated vehicle may apply to instances when the host-vehicle 12 is being operated in an automated-mode, i.e. a fully autonomous mode, where a human-operator of the host-vehicle 12 may do little more than designate a destination in order to operate the host-vehicle 12. However, full automation is not a requirement. It is contemplated that the teachings presented herein are useful when the host-vehicle 12 is operated in a manual-mode where the degree or level of automation may be little more than providing an audible or visual warning to the human-operator who is generally in control of the steering, accelerator, and brakes of the host-vehicle 12. For example, the lidar 10 may be used to merely assist the human-operator as needed to change lanes and/or avoid interference with and/or a collision with, for example, an object 14 such as an other-vehicle, a pedestrian, or a road sign.

The lidar 10 includes a laser 16 that generates a pulsed laser beam 18, hereafter often referred to as the beam 18. Preferably, the light emitted by the laser 16 to form the beam 18 has a frequency or wavelength that is not in the human visible spectrum so that human-beings do not see the beam 18. By way of example and not limitation, beam 18 may have a 905 nm wavelength pulsed at 10,000 Hz with a 10 ns pulse width. Various options for the laser 16 suitable for vehicle applications will be recognized by those in the art.

The lidar 10 also includes a beam-steering means 20 that steers the pulsed laser beam 18 in a direction 24 within a field-of-view 22 of the lidar 10. The beam-steering means 20 may use any of several know technologies that include, but are not limited to, a micro-electro-mechanical systems (MEMS) mirror device, an optical phase array beam steering device, moving mirrors, prisms, lenses, and diffractive gratings, which are common optical methods to steer the output from collimated or non-collimated light sources in multiple rotational axes.

Figure 2A:
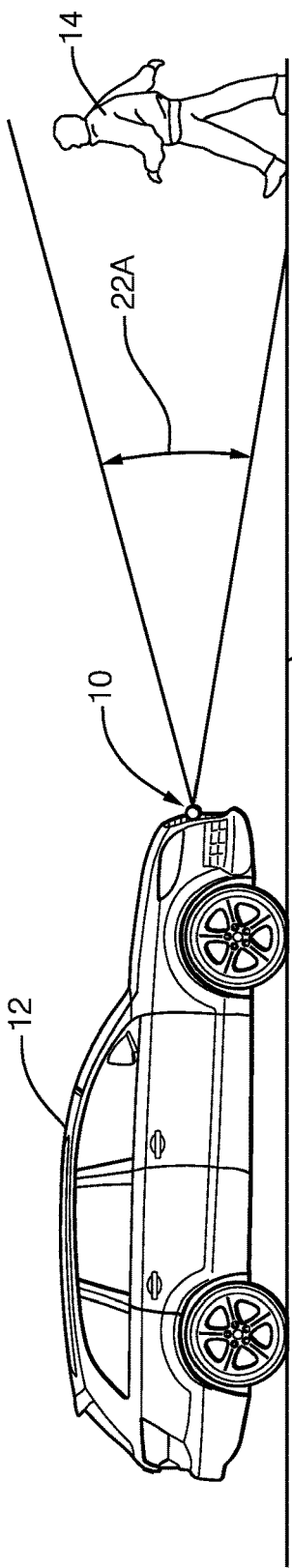
FIGS. 2A and 2B are, respectively, side and top views of a host-vehicle equipped with the lidar of FIG. 1 in accordance with one embodiment.
Figure 2B:
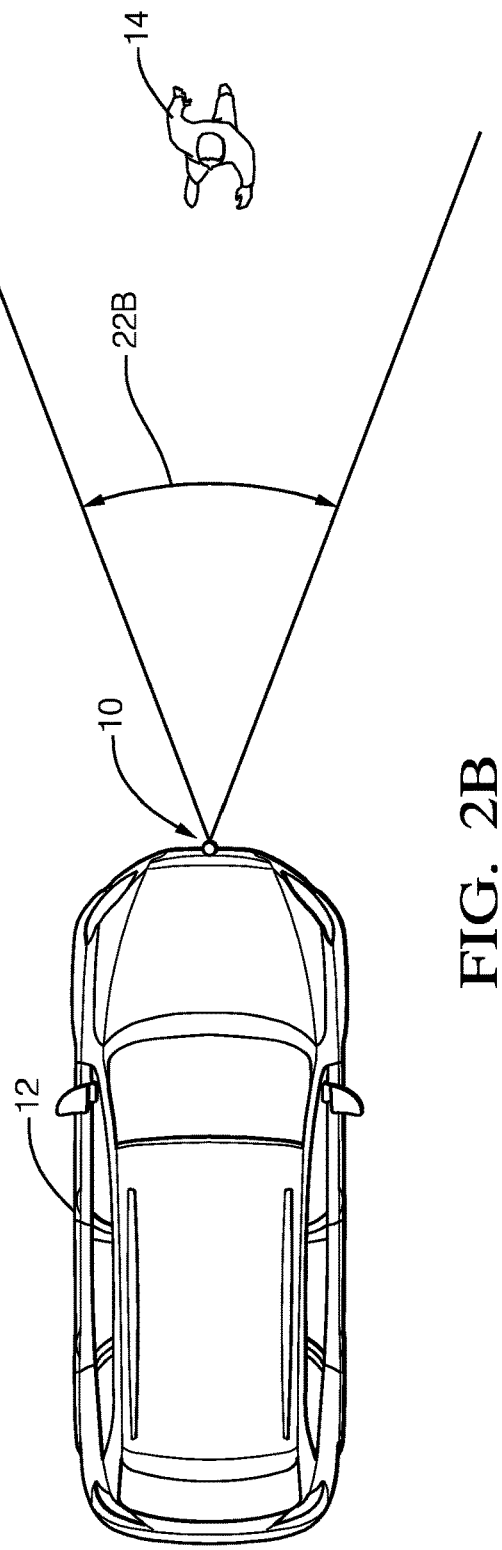

FIGS. 2A and 2B further illustrate a non-limiting example of the host-vehicle 12 equipped with the lidar 10. While the drawings may suggest that the entirety of the lidar 10 shown in FIG. 1 is located near the front bumper of the host-vehicle 12, this is not a requirement. It is contemplated that, for example, the laser 16, the beam-steering means 20, and a detector 26 used to detect light from the laser 16 reflected by the object 14 could be located near the front bumper or on the roof of the host-vehicle 12, while a controller 28 (FIG. 1, described in more detail later) could be located elsewhere such as inside the passenger compartment of the host-vehicle 12. Since objects of relevance with regard to travel of the host-vehicle 12 are typically located on the ground 30, the vertical-field-of-view 22A may be much narrower than the horizontal-field-of-view 22B, e.g. twenty-five degrees (25°) for the vertical-field-of-view 22A versus one-hundred-fifty degrees (150°) for the horizontal-field-of-view 22B. It is acknowledged that the scaling of FIGS. 2A and 2B do not closely correspond to these example values.

Figure 3:
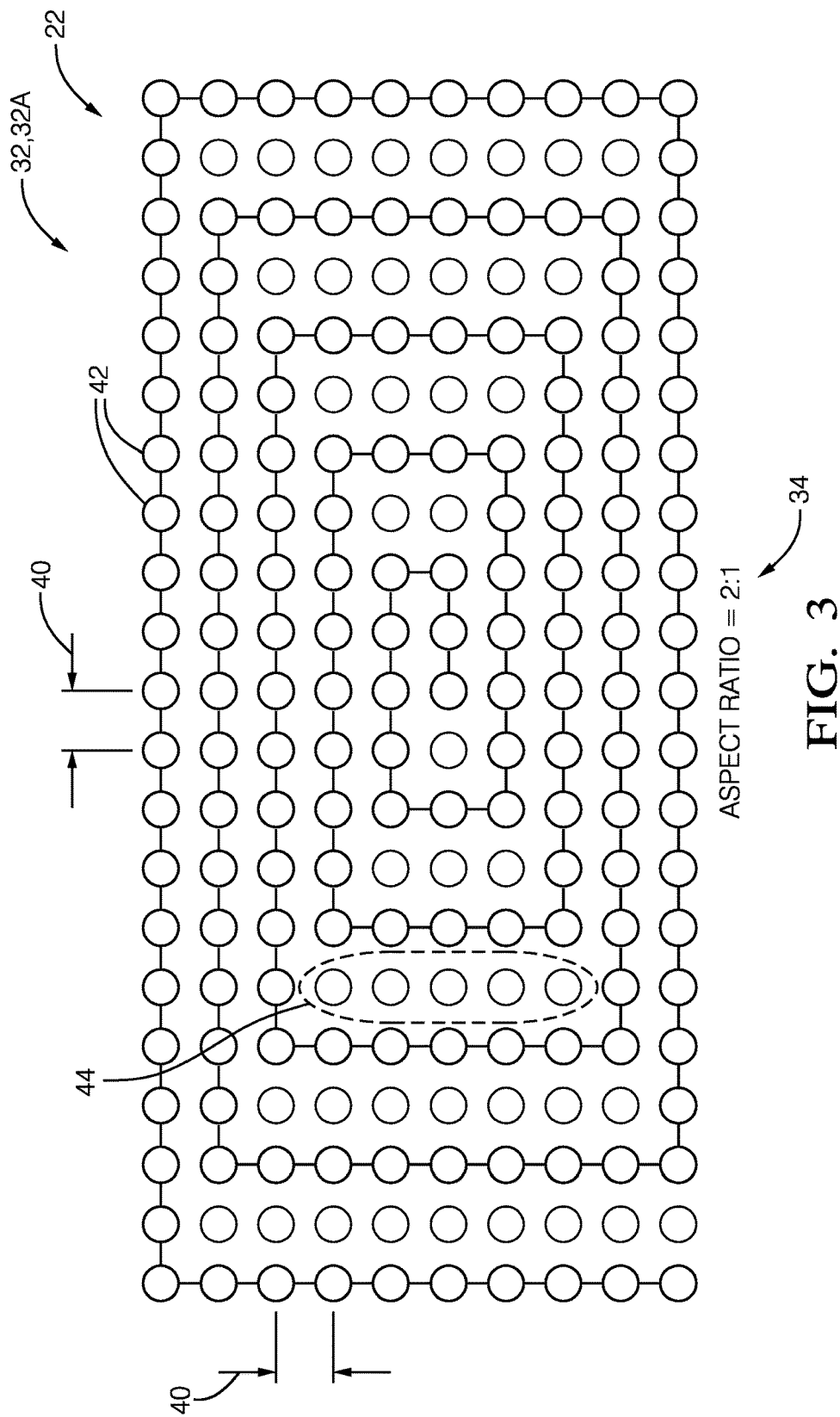
FIG. 3 is a scan pattern of the lidar of FIG. 1 in accordance with one embodiment.

FIG. 3 illustrates a non-limiting example of a rectangular-scanning-pattern 32, i.e. a non-square-scanning-pattern, that has an aspect-ratio 34 (2:1 in this example) that corresponds to the field-of-view 22. The rectangular-scanning-pattern 32 is characterized as rectangular-shaped, i.e. non-square, which distinguishes the rectangular-scanning-pattern 32 from a square-scanning patter that would by definition have an aspect ratio of 1:1. As used herein, the use of 'rectangular' to describe a scanning pattern is intended to differentiate the rectangular-scanning-pattern 32 described herein from any prior instance of a square-scanning-pattern with an aspect ratio of 1:1. In other words, if prior art shows a scanning pattern with an aspect ratio of 1:1, that prior art is not relevant to the rectangular-scanning-pattern 32 described herein, for reasons that will become clear in the further description below. It is contemplated that scan-patterns with a value other than 2:1 for the aspect ratio 34 may be preferable. 2:1 is only used in this instance as simplifies the explanation of the lidar 10.

Referring again to FIG. 1, the lidar 10 includes the controller 28 which is in communication with, at least, the laser 16, and the beam-steering means 20. The controller 28 may include a processor (not specifically shown) such as a microprocessor or other control circuitry such as analog and/or digital control circuitry including an application specific integrated circuit (ASIC) for processing data as should be evident to those in the art. The controller 28 may include memory (not specifically shown), including non-volatile memory, such as electrically erasable programmable read-only memory (EEPROM) for storing one or more routines, thresholds, and captured data. The one or more routines may be executed by the processor to perform steps for controlling the laser 16 by a pulse control block 36 and the beam-steering means 20 by a pattern control block 38 as described herein.

In general, the controller 28 coordinates the operation of the laser 16 and the beam-steering means 20 such that the lidar 10 is characterized by an angular-resolution 40, a quarter degree (0.25°) for example. That is, the timing of the pulses emitted by the laser 16 and the operation of the beam-steering means 20 is coordinated to produce the desired scan pattern. It should be understood that the angular-resolution 40 of the lidar 10 will determine the spacing between consecutive beam-spots 42 illustrated in FIG. 3. It should also be understood that if the distance from the lidar 10 to the plane upon which the rectangular-scanning-pattern 32 is shown for FIG. 3 is changed, the distance between the consecutive beam-spots 42 will change accordingly.

The controller 28 operates the beam-steering means 20 in accordance with a first rectangular spiral pattern 32A characterized by an aspect-ratio 34 that corresponds to the field-of-view 22. Assuming that the vertical angular resolution of the lidar 10 is equal to the horizontal angular resolution of the lidar 10, e.g. 0.25° for both vertical and horizontal resolutions, then for a value of the aspect ratio 34 that is not 1:1 such as that used for the first rectangular spiral pattern 32A, the rectangular (i.e. non-square) aspect ratio causes a scan-segment 44 to be skipped. As used herein, the term 'scan-segment' is used to refer to a string of two or more beam-spots aligned in either a vertical or horizontal direction. Because of the 2:1 value of the aspect ratio 34 selected for the rectangular-scanning-pattern 32, every other vertical scan segment is skipped. If other values of the aspect ratio were selected, 4:1 or 3:2 (i.e. 1.5:1) for example, the rate of occurrence of the scan-segment 44 being skipped would be different, more or less frequently, respectively, when compared to an aspect ratio of 2:1. In other words, due to the aspect-ratio 34, a present-scan (e.g. the scan shown in FIG. 3) of the field-of-view 22 is not scanned entirely at the angular-resolution 40. Because of the skipped instances of the scan-segment 44 for an aspect ratio of 2:1, the horizontal resolution along a horizontal mid-line of the rectangular-scanning-pattern 32 has an effective angular-resolution of 0.5°, while the vertical angular-resolution remains at 0.25°, assuming that a horizontal instance of scan-segment is not skipped. Some may describe an angular-resolution of 0.5° as being less than or lower resolution when compared to an angular-resolution of 0.25° even though the value of the angular-resolution 40 is increased.

FIG. 4A shows the first rectangular spiral pattern 32A of FIG. 3 without showing the individual instances of the beam-spots 42, and where the first rectangular spiral pattern 32A starts at a center 46 of the field-of-view 22 and proceeds toward a perimeter 48 of the field-of-view 22. Starting the scan at the center 46 may be advantageous because objects of the most interest to the operation of the host-vehicle will likely be at the center 46. If the controller 28 is configured to begin image processing before the entire frame of the scan is complete, an object of particular interest at the center 46 may be more rapidly identified.

Figure 4C:
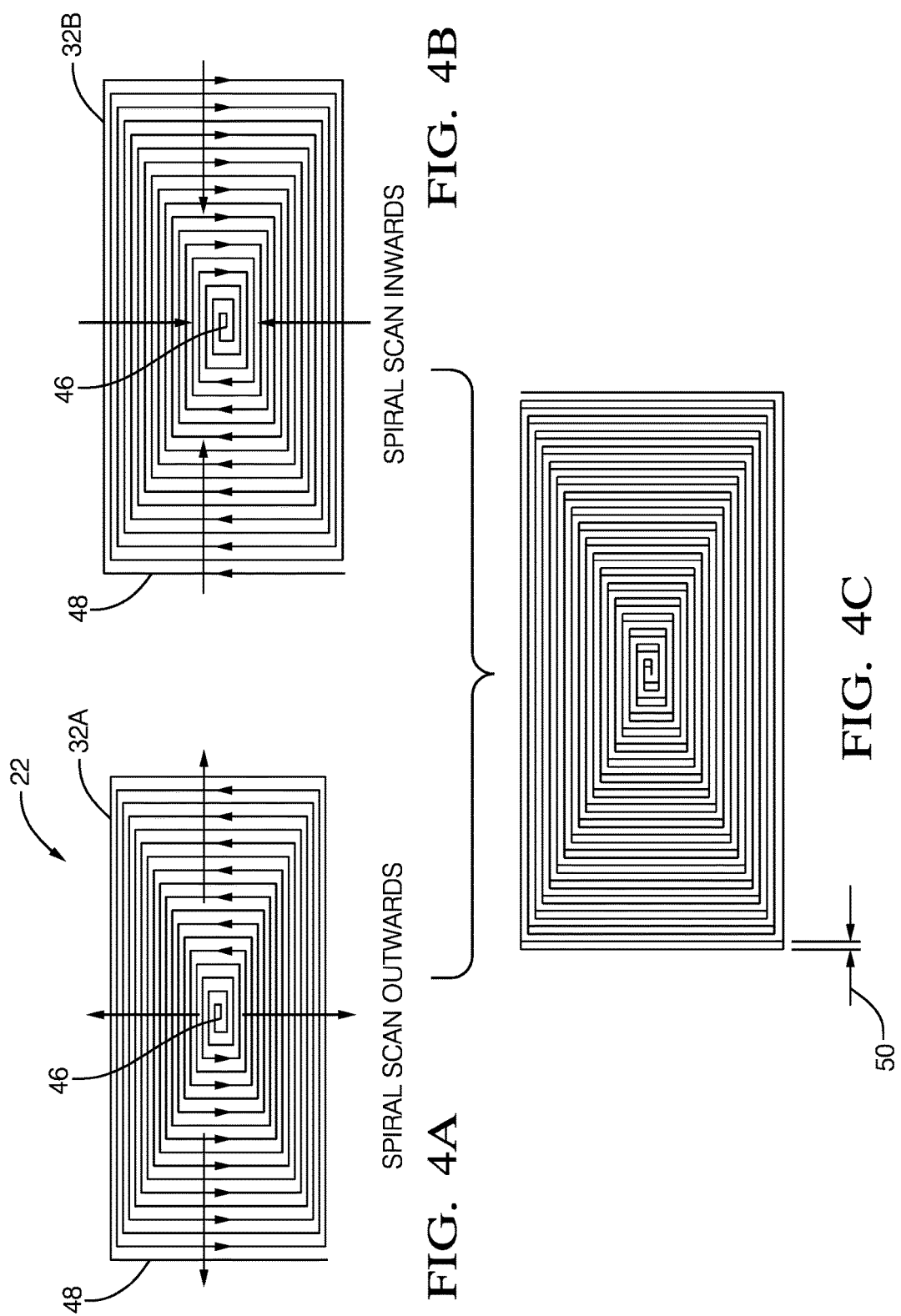
FIG. 4C is a scan pattern arising from the combination of the scan patterns of FIGS. 4A and 4B in accordance with one embodiment.

FIG. 4B shows a non-limiting alternative where the controller 28 operates the beam-steering means 20 during a subsequent scan (subsequent to the aforementioned present scan shown in FIG. 4A) in accordance with a second rectangular spiral pattern 32B configured to scan the scan-segment 44 skipped by the first rectangular spiral pattern 32A. In this example, the second rectangular spiral pattern 32B starts at the perimeter 48 of the field-of-view and proceeds toward the center 46 of the field-of-view 22. In order for the second rectangular spiral pattern 32B to scan the scan-segment 44 skipped by the first rectangular spiral pattern 32A, the second rectangular spiral pattern 32B will need to be offset from the first rectangular spiral pattern 32A by a scan-offset 50 (FIG. 4C). Having the subsequent scan start at the perimeter 48 proceed toward the center 46 may be advantageous to more quickly identify distant objects that appear relatively small in the field-of-view 22 and were missed during the present (i.e. previous) scan. Alternatively, both the first and second patterns may both start at a center 46 and proceeds toward a perimeter 48 such that the first rectangular spiral pattern 32A differs from the second rectangular spiral pattern 32B only by the scan-offset 50.

FIG. 4C illustrates how the combination of the two similar scans offset by the scan-offset 50 would provide complete coverage of all of the beam-spots 42 if the aspect ratio 34 is equal to 2:1. It is recognized that if the aspect ratio 34 is greater than 2:1 that more than two scans may be necessary for all of the beam-spots 42 to be scanned. For example, if the aspect ratio 34 is 4:1, then it will be necessary to complete four scans for all of the beam-spots 42 to be scanned.

Accordingly, a scanning lidar (the lidar 10), a controller 28 for the lidar 10, and a method of operating the lidar 10 is provided. The rectangular spiral scanning patterns 32, 32A, 32B described herein provide for an efficient spiral scan of the field-of-view 22.

While this invention has been described in terms of the preferred embodiments thereof, it is not intended to be so limited, but rather only to the extent set forth in the claims that follow.

We claim:

1. A scanning lidar, said lidar comprising:
   a laser that generates a pulsed laser beam;
   a beam-steering means that steers the pulsed laser beam to scan a field-of-view of the lidar;
   a controller in communication with the laser and the beam-steering means, wherein the controller coordinates operation of the laser and the beam-steering means such that the lidar has an angular-resolution, and the controller operates the beam-steering means in accordance with a first rectangular spiral pattern formed of a predetermined series of alternating possible instances of vertical and horizontal scan-segments, each possible instance of scan-segment comprising two or more beam-spots aligned in either a vertical or horizontal direction, wherein spacing between beam-spots and possible instances of scan-segments is equal to the angular-resolution, said first rectangular pattern has an aspect-ratio that corresponds to the field-of-view, wherein the controller is configured to operate the beam-steering means to cause at least one possible instance of scan-segment of the first rectangular spiral pattern to be skipped during a present-scan of the field-of-view, whereby the field-of-view is not scanned entirely at the angular-resolution.

2. The lidar in accordance with claim 1, wherein the first rectangular spiral pattern starts at a center of the field-of-view and proceeds toward a perimeter of the field-of-view.

3. The lidar in accordance with claim 1, wherein the controller operates the beam-steering means during a subsequent scan in accordance with a second rectangular spiral pattern configured to scan the at least one possible instance of scan-segment skipped by present-scan.

4. The lidar in accordance with claim 3, wherein present-scan differs from the second rectangular spiral pattern only by a scan-offset.

5. The lidar in accordance with claim 3, wherein the first rectangular spiral pattern starts at a center of the field-of-view and proceeds toward a perimeter of the field-of-view, the second rectangular spiral pattern starts at the perimeter of the field-of-view and proceeds toward the center of the field-of-view.

6. The lidar in accordance with claim 1, wherein the controller is configured to operate the beam steering means to skip one or more possible instances of vertical scan-segments and not skip possible instances of horizontal scan-segments.

7. The lidar in accordance with claim 1, wherein the first rectangular spiral pattern consists of vertical scan-segments and horizontal scan-segments.

8. A method of operating a lidar, said method comprising:
generating a pulsed laser beam with a laser;
steering the pulsed laser beam to scan a field-of-view with a first rectangular spiral pattern formed of a predetermined series of alternating possible instances of vertical and horizontal scan-segments, each possible instance of scan-segment comprising two or more beam-spots aligned in either a vertical or horizontal direction, wherein spacing between beam-spots and possible instances of scan-segments is equal to the angular-resolution, said first rectangular pattern has an aspect-ratio that corresponds to the field-of-view, wherein steering the pulsed laser beam causes at least one possible instance of scan-segment of the first rectangular spiral pattern to be skipped during a present-scan of the field-of-view, whereby the field-of-view is not scanned entirely at the angular-resolution.

9. The method in accordance with claim 8, wherein the first rectangular spiral pattern starts at a center of the field-of-view and proceeds toward a perimeter of the field-of-view.

10. The method in accordance with claim 8, wherein the method comprises
steering the pulsed laser beam during a subsequent scan is in accordance with a second rectangular spiral pattern configured to scan the at least one possible instance of scan-segment skipped by the present-scan.

11. The method in accordance with claim 10, wherein the present-scan differs from the second rectangular spiral pattern only by a scan-offset.

12. The method in accordance with claim 10, wherein the first rectangular spiral pattern starts at a center of the field-of-view and proceeds toward a perimeter of the field-of-view, the second rectangular spiral pattern starts at the perimeter of the field-of-view and proceeds toward the center of the field-of-view.

13. The method in accordance with claim 8, wherein steering the pulsed laser beam includes skipping one or more instances of possible vertical scan-segments and not skipping any instances of possible horizontal scan-segments.

14. The method in accordance with claim 8, wherein the first rectangular spiral pattern consists of vertical scan-segments and horizontal scan-segments.

15. A method of operating a scanning lidar, said method comprising:
generating a pulsed laser beam;
steering the pulsed laser beam in accordance with a first rectangular spiral pattern formed of a predetermined series of alternating possible instances of vertical and horizontal scan-segments, each possible instance of scan-segment comprising two or more beam-spots aligned in either a vertical or horizontal direction, wherein spacing between beam-spots and possible instances of scan-segments is equal to an angular-resolution of the scanning lidar;
causing at least one possible instance of scan-segment of the first rectangular spiral pattern to be skipped; and
after causing at least one possible instance of scan-segment of the first rectangular spiral pattern to be skipped, steering the pulsed laser beam in accordance with a second rectangular spiral pattern configured to scan the at least one possible instance of scan-segment that was skipped.

16. The method in accordance with claim 15, wherein the first rectangular spiral pattern differs from the second rectangular spiral pattern only by a scan-offset.

17. The method in accordance with claim 16, wherein the first rectangular spiral pattern starts at a center of the first rectangular spiral pattern and proceeds toward a perimeter of the first rectangular spiral pattern, and the second rectangular spiral pattern starts at the perimeter of the second rectangular spiral pattern and proceeds toward the center of the second rectangular spiral pattern.

* * * * *